United States Patent [19]
Brown et al.

[11] Patent Number: 5,511,515
[45] Date of Patent: Apr. 30, 1996

[54] ANIMAL TRAINING AND RESTRAINING HARNESS

[76] Inventors: Donald D. Brown; Barbara J. Brown, both of 1600 E. 7th St., Stuart, Fla. 34996

[21] Appl. No.: 248,380

[22] Filed: May 24, 1994

[51] Int. Cl.$^6$ .................................................. A01K 27/00
[52] U.S. Cl. .................. 119/771; 119/864; 119/907; 119/792
[58] Field of Search ................................ 119/820, 856, 119/905, 907, 792, 864, 793, 771; 54/23, 65, 67

[56] References Cited

U.S. PATENT DOCUMENTS

| | | | |
|---|---|---|---|
| 1,685,435 | 9/1928 | Philbrick | 119/907 |
| 2,670,712 | 3/1954 | Patience et al. | 119/856 |
| 3,310,034 | 3/1967 | Dishart | 119/771 |
| 3,769,939 | 11/1973 | Wais et al. . | |
| 3,994,264 | 11/1976 | Flynt . | |
| 4,570,424 | 2/1986 | Simpson | 54/23 |
| 4,676,198 | 6/1987 | Murray . | |
| 4,715,618 | 12/1987 | Harris . | |
| 4,907,541 | 3/1990 | Thompson . | |
| 4,964,369 | 10/1990 | Sporn | 119/907 |
| 4,970,991 | 11/1990 | Luce . | |
| 5,035,203 | 6/1991 | Cardenas . | |
| 5,125,219 | 6/1992 | Sligo | 54/23 |
| 5,150,667 | 9/1992 | Salidrigas . | |
| 5,154,660 | 10/1992 | Snyder et al. . | |
| 5,167,203 | 12/1992 | Scott et al. . | |
| 5,325,819 | 7/1994 | Krauss | 119/907 |
| 5,335,627 | 8/1994 | Bandimere | 119/856 |
| 5,359,964 | 11/1994 | Sporn | 119/864 |

FOREIGN PATENT DOCUMENTS

| | | | |
|---|---|---|---|
| 2304284 | 10/1976 | France | 119/792 |
| 2551628 | 3/1985 | France | 119/792 |

Primary Examiner—Todd E. Manahan
Attorney, Agent, or Firm—Malin, Haley, DiMaggio & Crosby

[57] ABSTRACT

A harness is disclosed that fits over an animal's head, such as a dog, and buckles around his chest behind the front legs. Straps, independent of the harness, are fitted around the dogs front legs and are attached to the leash through four D-rings (two D-rings attached to each side of the harness). The lower D-rings are located in such a position that the leg straps, when pulled back by the person walking the dog, pull straight back or perpendicular to the dogs legs. As the animal tries to walk faster or pull faster than the person walking the dog walks, the straps around the dog's legs pull back perpendicular to the dog's legs preventing the animal from walking faster than the person walking the dog. The harness is designed to restrict the movement of the dogs front legs by the force of the dogs own pulling power. The more the dog tries to pull, the less movement the dog has in his front legs. The dog is literally controlled by his own power and the pace the trainer or owner set for himself, without pain or injury to the dog.

13 Claims, 3 Drawing Sheets

ANIMAL TRAINING AND RESTRAINING HARNESS

BACKGROUND OF THE INVENTION

1. Field of the Invention

This invention relates generally to an animal restraining device and more particularly to a dog harness for preventing movement of a dog which can also be used for training purposes.

2. Description of the Prior Art

Harnesses for animals, such as dogs, for restraining and training purposes are well known in the art. Examples of such include U.S. Pat. No. 3,769,939 issued to Wais et al; U.S. Pat. No. 5,150,667 issued to Salidrigas; and U.S. Pat. No. 3,994,264 issued to Flynt. U.S. Patent No. 3,769,939 discloses a restraining and training device wherein one or more segments of a flexible cord are adapted for positioning in a cross-wise pattern across the animal's chest with cord portions extending along the animals neck on both sides thereof and through one or more collar rings. The device is provided with loop elements, associated with the cord, for encircling the upper portions of the animals forelegs. Operatively, pulling forces applied on the harnessing device tend to draw the forelegs together and effect temporary inhibition of further attempts at movement of the animal.

U.S. Pat. No. 5,150,667 discloses an animal restraining apparatus which includes a pair of leg encircling members connected together on their lower portions by a pair of elongated straps and connected together on their upper portions by a shoulder engaging unit. The shoulder engaging unit is provided with a ring element adapted to be connected to a conventional leash. The apparatus is designed to restrain an animal, such as a dog, without applying any choking forces to the dog's neck.

U.S. Pat. No. 3,994,264 discloses a dog harness for preventing the dog from jumping. The harness includes a loop to be fitted around the dog's neck and having a strap extending under the dog to two loop-shaped straps to be fitted around the hind legs. A strap is connected to each of the loop shaped straps and extends over the dog's hind quarters for holding the two loop shaped straps high around the dog's hind legs. After the harness is fitted in place on a dog, the harness will prevent the dog from jumping while allowing the dog freedom in walking, running, etc.

One animal restraining feature missing in the prior art is the ability to completely disable the animal from moving in a normal fashion. The Wais et al. patent discussed above, only causes the animals forelegs to be drawn towards each other. Such feature does not prevent the animal from using its forelegs, it only limits the function of such. Thus, stronger and wilder dogs, could still provide a pulling and bolting force despite wearing the Wais et al. harness.

Accordingly, what is needed in the art is a restraining and training device or apparatus that completely inhibits an animal's use of its forelegs, when such animal is pulling or otherwise misbehaving while being walked or trained.

SUMMARY OF THE INVENTION

The present invention provides a harness that fits over an animal's head, preferably a dog, and buckles around the animal's chest behind the animal's front legs. Straps, independent of the harness, are fitted around the dogs front legs and are attached to a leash through a plurality of D-rings.

Lower D-rings are located in such a position that the leg straps, when pulled back by the person walking the dog, pull straight back or perpendicular to the dog's legs. As the animal tries to pull harder or walk faster than a person walking such animal, the straps around the dog's legs pull back perpendicular to the dog's legs. Thus, the animal is prevented from walking faster than the person walking such animal.

The present invention is designed to restrict the movement of the dog's front legs by the force of the dog's own pulling power. The more the dog tries to pull, the less movement the dog has in his or her front legs. Thus, the dog is literally controlled by his own power and the pace a trainer or owner sets for him or herself, without any pain or injury to the animal.

The harness also includes a seat belt safety loop across the top side of the neck portion of the harness. When a conventional seat belt is inserted through the safety loop and buckled, the animal is held in place and protected while the animal rides in the car. This feature of the present invention operates in conjunction with existing automobile seat belts to safely and comfortably confine the animal in place while an automobile is moving. Thus, distractions to the driver from the animal are minimize, while also allowing the driver to safely leave the windows opens without the animal escaping or causing harm to individuals passing by the open window.

It is an object of the present invention to provide an animal harness which prevents the animal from pulling or overpowering a person walking such animal, without causing any harm or injury to the animal.

It is another object of the present invention to provide an animal harness which aids a trainer in training such animal, without causing any harm or injury to the animal.

It is a further object of the present invention to provide an animal harness which confines such animal in place when traveling with the animal in an automobile, truck, van, etc.

In accordance with these and other objects which will become apparent hereinafter, the instant invention will now be described with particular reference to the accompanying drawings.

BRIEF DESCRIPTION OF THE DRAWINGS

The above mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENTS

Figure 1:
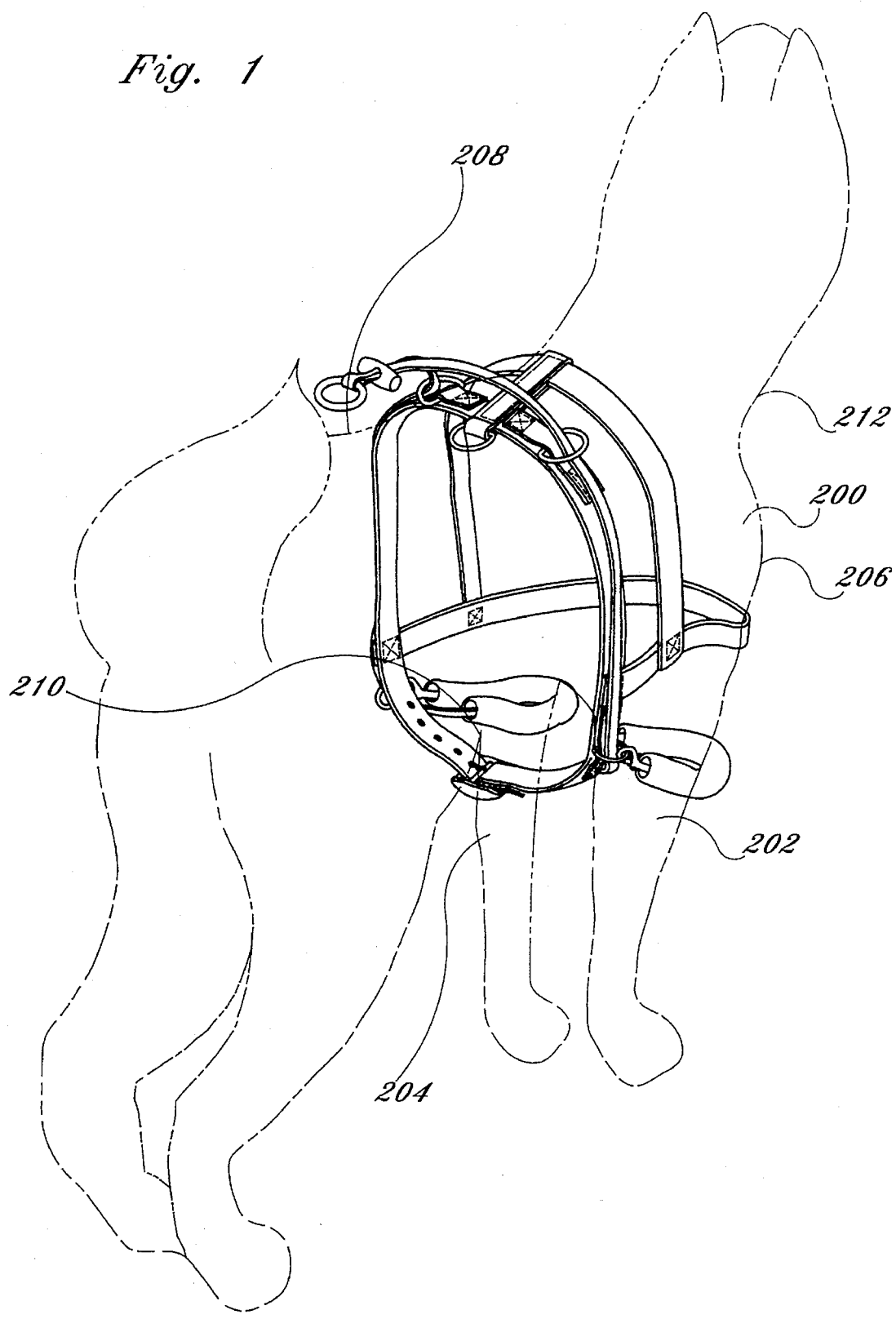
FIG. 1 is a perspective view of the animal harness device of the present invention disposed in place on a dog.
Figure 2:
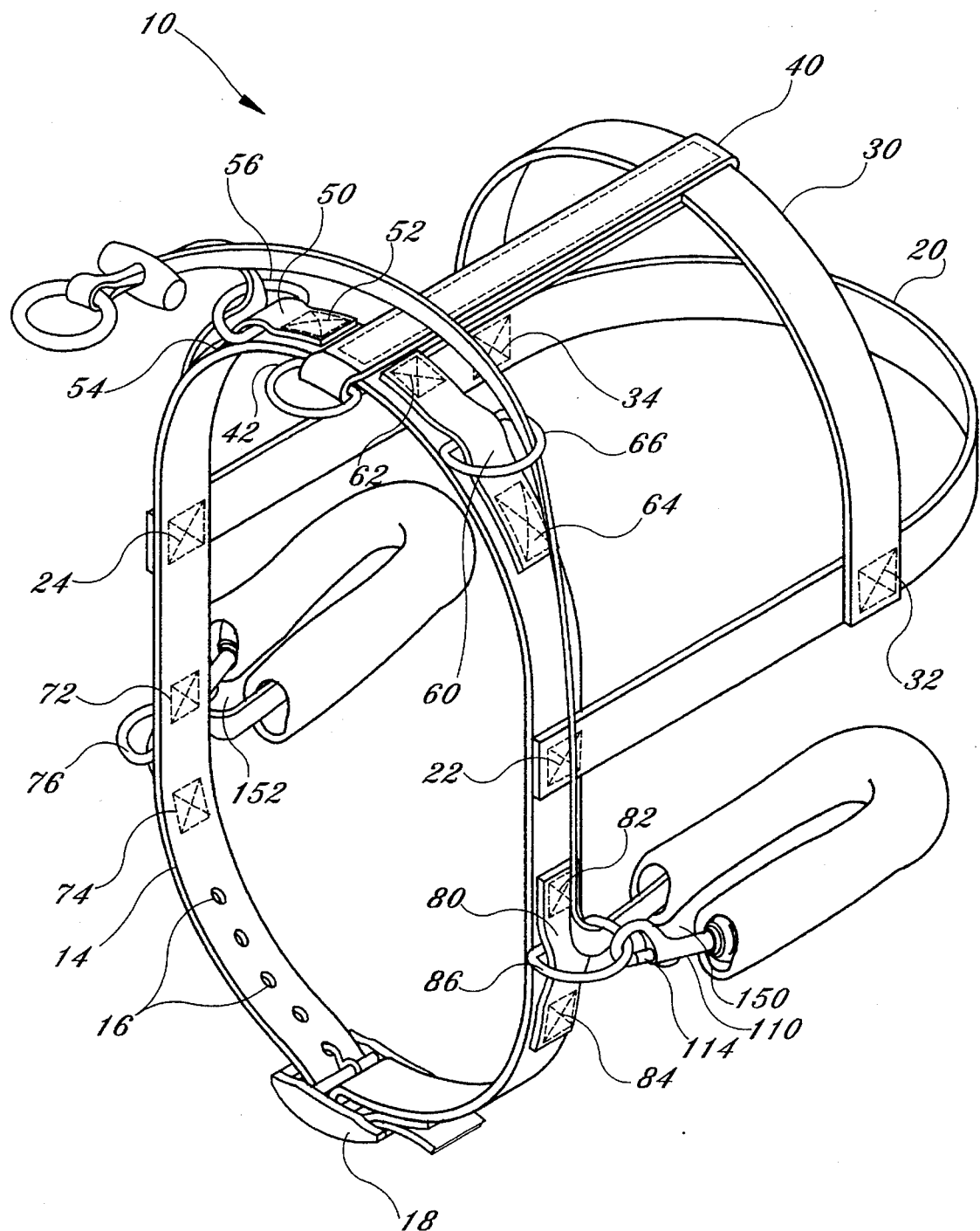
FIG. 2 is an isolated perspective view of the present invention.

Referring now to the drawings, the present invention is generally shown as an animal harness 10. Harness 10 includes a main body portion 12 which can be generally comprised of a first vertical strap 14, horizontal strap 20, second vertical strap 30 and a cross strap 40. First vertical strap 14 has a plurality of holes 16 disposed at one end of strap 14 and a buckle 18 disposed at the opposite end of strap 14 for adjusting and securing strap 14 around the stomach and back areas, 208 and 210, respectively, of an animal, such as the dog 200 shown in FIG. 1. Other attachment means can be disposed at the ends of strap 14, in lieu of holes 16 and buckle 18, and are intended to be within the scope of the present invention. Such alternative attachment means include the use of hook and loop fasteners (commonly referred to as VELCRO), snaps, buttons, etc.

Horizontal strap 20 is shown attached to first vertical strap 14 at attachment points 22 and 24, while second vertical strap 30 is shown attached to horizontal strap 20 at attachment points 32 and 34. The straps are preferably attached to each other by stitching, however, other conventional attachments may be utilized in lieu of stitching. Cross strap 40 is shown disposed around the top portion of vertical straps 14 and 30 and can be sewn to itself and/or vertical straps 14 and 30 to retain cross strap 40 at the top portion of such straps. Before disposing strap 40 around straps 12 and 30, cross strap 40 can be inserted through a D-ring 42. D-ring 42 is, thus, secured by strap 40 and can be utilized for attaching a conventional animal leash, whenever the teachings of the present invention, described below, are not required, i.e. when the animal is behaving.

A pair of upper strips 50 and 60 are attached to first vertical strap 14 at attachments points 52, 54 and 62, 64, respectively. Strips 50 and 60 are attached to first vertical strap 14 intermediate the points where strap 20 is attached to strap 14 and where strap 40 is disposed around strap 14. Before attachment, strips 50 and 60 are inserted through D-rings 56 and 66, respectively. Thus, upon attachment D-rings 56 and 66 are secured/retained in place by strips 50 and 60, respectively.

Similarly, a pair of lower strips 70 and 80 are attached to first vertical strap 14 at attachments points 72, 74 and 82, 84, respectively. Strips 70 and 80 are attached to first vertical strap 14 intermediate the points where strap 20 is attached to strap 14 and where holes 16 and buckle 18 are disposed on strap 14. Before attachment, strips 70 and 80 are inserted through D-rings 76 and 86, respectively. Thus, upon attachment D-rings 76 and 86 are secured/retained in place by strips 70 and 80, respectively.

An immobilizing cord or strap 90 is operatively associated with straps through D-rings 56, 66, 76 and 86. Cord 90 has snap hooks 110 and 120 attached at each end by inserting the respective ends of cord 90 through the ring portions 112 and 122 of hooks 110 and 120, respectively, and attaching such ends back to cord 90 at respective attachment points 92 and 94. Such attachment is preferably by stitching, though other attachment means are available. The middle portion of strap 96 is brought together, sewn and crimped by strap loc 100 to form a loop 96 for retaining O-ring 102. However, loop 96 can be formed with just bringing the middle portion of cord 90 together and either sewing or crimping.

The ends of cord 90 can be inserted through apertures 132 and 142 of protective pads 130 and 140, respectively, either before or after attaching snap hooks 110 and 120 to their respective ends of cord 90. Protective pads 130 and 140, provide cushion and comfort to the forelegs of the animal when harness 10 is attached to the animal. Preferably, protective pads are constructed from sheep skin. However, any material which provides the desired characteristics of protecting the animal from injury or pain from the rubbing or digging of the ends of cord 90 may be utilized and is within the scope of the invention.

Immobilizing cord 90 is connected to body portion 12 by inserting snap hook 110 through D-rings 66 and 86 and the hook portion 114 of snap hook 110 is connected back to D-ring 86 to form a first leg receiving loop 150. Similarly, snap hook 120 is inserted through D-rings 56 and 76 and the hook portion 124 of snap hook 120 is connected back to D-ring 76 to form a second leg receiving loop 152.

To place harness 10 around dog 200 as seen in FIG. 1, the ends of first vertical strap 14 are not connected and, thus, hanging loose and the dog's head is inserted through the area or aperture created by the attachment of second vertical strap 30 to horizontal strap 20. Once the dog's head is inserted, the opposite ends of first vertical strap 14 are connected, by the operation of buckle 18 with one of the plurality of holes 16, which is selected based on the size dog. At this point, the main body portion 12 of harness 10 is disposed in place on dog 200, and first and second leg receiving loops 150 and 152, respectively, are hanging loose therefrom. The dog's right foreleg 202 is then inserted through first leg receiving loop 150 and the dog's left foreleg 204 is inserted through first leg receiving loop 152.

It should be apparent to one skilled in the art that, left foreleg 204 can be inserted through receiving loop 152 before right foreleg 202 is inserted through receiving loop 150. It is should also apparent, that the immobilizing portion 89 can be disposed around the dog's forelegs 202 and 204 before the main body portion 12 of harness 10 is attached to dog 200. Furthermore, one foreleg can be inserted through its respective receiving loop, then main body portion 12 attached to dog 200 and then insert the other foreleg through its respective receiving loop.

Once harness 10 is properly attached to dog 200, the dog is ready for walking or training. In operation, harness 10 fits over the dog's head and is strapped around the dog's chest 206 and back 210 while buckling around the stomach area 208 behind the animal's front legs 202 and 204. The immobilizing means 89 is fitted around front legs 202 and 204 and a conventional leash (not shown) is attached to o-ring 102 of immobilizing means 89.

Immobilizing means 89 is positioned around front legs 202 and 204 such that when the conventional leash attached to o-ring 102 leg straps, is pulled, it causes the ends of cord 90 disposed around forelegs 202 and 204 to be pulled straight back or perpendicular to the dog's legs, thus literally restraining the dog's foreleg and effectively immobilizing dog 200. As dog 200 tries to pull harder or walk faster than a person walking such animal, the ends of cord 90 disposed around forelegs 202 and 204 pull back perpendicular to the dog's legs. Thus, the animal is prevented from walking faster than the person walking such animal.

Accordingly, the present invention is designed to restrict the movement of the dog's front legs by the force of the dog's own pulling power. The more the dog tries to pull, the less movement the dog has in his or her front legs. Thus, the dog is literally controlled by his own power and the pace a trainer or owner sets for him or herself, without any pain or injury to the animal.

Figure 3:
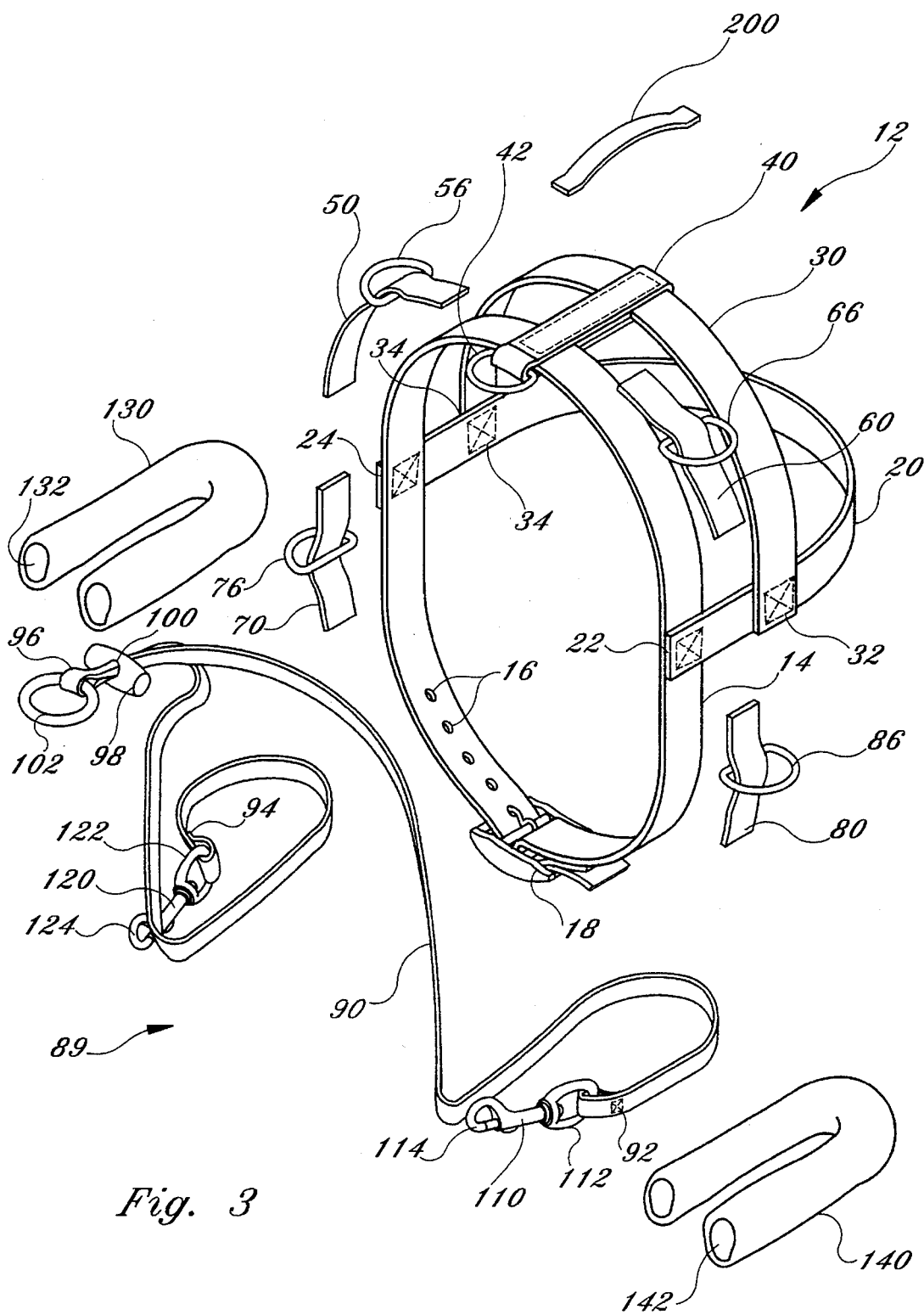
FIG. 3 is an exploded perspective view of the present invention.

A fastening strap 250 (FIG. 3) may be disposed over and attached to cross strap 40 by conventional means such as stitching, thus creating a seat belt aperture or loop between strap 40 and 250. A conventional seat belt is inserted through the loop thus confining the animal in a safe position while traveling in a vehicle. To accommodate newer composite seat belt designs having the lap and chess portions of the belts connected as a single unit, one end of strap 250 can be removeably connected to strap 40 by means such as VELCRO, snaps, buttons, etc. In use the composite seat belt would be buckled with the animal in proper position and then fastening strap would be crossed over the seat belt and removeably connected.

Cord or strap 90 can be long enough to act also as a leash, thereby eliminating the need to attach a leash to O-ring 102, and also eliminating the need for such O-ring. In this design, a handle means can be incorporated where o-ring 102 normally is disposed. Furthermore, immobilizing means 89 can be utilized with numerous body designs and is not limited to body portion 12. For example, strap 30 nor strap 40 can easily be eliminated without effecting the operation of the present invention. If strap 30 is eliminated a smaller cross strap holding D-ring 42 can be disposed around first vertical strap 14. Furthermore, if the ability to bypass the use of immobilizing means 89 is desired, then D-ring 42 and cross strap 40 may be removed.

Though the present invention will be primarily used with dogs, it is to be understood that the present invention is not limited to such. Thus, the present invention can be utilized with various four-legged animals and such use is within the scope of the invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A harness for controlling and immobilizing an animal, said animal having a plurality of legs, including a left foreleg and a right foreleg, comprising:

a body member for disposal around said animal;

a first loop means for disposal around said left foreleg;

a second loop means for disposal around said right foreleg; and means for pulling said first and second loop means perpendicular to the left foreleg and right foreleg of said animal to restrict movement of the animal's left foreleg and right foreleg thus effectively restraining and immobilizing the animal, said means for pulling including a cord member operatively associated with said first loop means and said second loop means, said cord member having a first end and a second end;

wherein said first end of said cord member having a first snap hook member attached thereto and said second end of said cord member having a second snap hook member attached thereto;

wherein a top portion of said body member having a first D-ring and a second D-ring attached thereto and wherein a bottom portion of said body member having a third D-ring and a fourth D-ring attached thereto, said first D-ring and said third D-ring attached to a left side of said body member and said second D-ring and said fourth D-ring attached to a right side of said body member;

wherein said first loop means is formed by inserting said first snap hook member and said first end of said cord member through said first D-ring and said third D-ring and attaching said first snap hook member to said third D-ring, wherein said second loop means is formed by inserting said second snap hook member and said second end of said cord member through said second D-ring and said fourth D-ring and attaching said second snap hook member to said fourth D-ring.

2. The harness of claim 1 further including means for attaching a conventional leash to said body member and bypassing said means for pulling.

3. The harness of claim 1, further including means for retaining said animal in place while the animal rides in a moving vehicle.

4. The harness of claim 3, wherein said means for retaining comprises a strap member associated with said body member to form a loop.

5. The harness of claim 4 further including means for attaching a conventional leash to said cord member.

6. The harness of claim 5 wherein said means for attaching is a ring member disposed and retained along said cord member intermediate said first end and said second end of said cord member.

7. The harness of claim 6 wherein said first loop means and said second loop means having means for protecting the animal's left and right forelegs when said first and second loop means are disposed around said left and right forelegs, respectively.

8. The harness of claim 7 wherein said means for protecting are protective padding disposed around said first and second loop means.

9. The harness of claim 8 wherein said protective padding is constructed from sheep skin.

10. A harness for controlling and immobilizing an animal, said animal having a plurality of legs, including a left foreleg and a right foreleg, comprising:

a body member for disposal around said animal;

a first loop means for disposal around said left foreleg;

a second loop means for disposal around said right foreleg; and a cord member for pulling said first and second loop means perpendicular to the left foreleg and right foreleg of said animal to restrict movement of the animal's left foreleg and right foreleg thus effectively restraining and immobilizing the animal, said cord member operatively associated with said first loop means and said second loop means, said cord member having a first end and a second end, said first end of said cord member having a first snap hook member attached thereto and said second end of said cord member having a second snap hook member attached thereto, wherein a top portion of said body member having a first D-ring and a second D-ring attached thereto and wherein a bottom portion of said body member having a third D-ring and a fourth D-ring attached thereto, said first D-ring and said third D-ring attached to a left side of said body member and said second D-ring and said fourth D-ring attached to a right side of said body member, wherein said first loop means is formed by inserting said first snap hook member and said first end of said cord member through said first D-ring and said third D-ring and attaching said first snap hook member to said third D-ring, wherein said second loop means is formed by inserting said second snap hook member and said second end of said cord member through said second D-ring and said fourth D-ring and attaching said second snap hook member to said fourth D-ring.

11. The harness of claim 5 wherein said first loop means and said second loop means having means for protecting the animal's left and right forelegs when said first and second loop means are disposed around said left and right forelegs, respectively.

12. The harness of claim 10 further including a ring member for attaching a conventional leash to said cord member, said ring member disposed and retained along said cord member intermediate said first end and said second end of said cord member.

13. A harness for controlling and immobilizing an animal, said animal having a plurality of legs, including a left foreleg and a right foreleg, comprising:

a body member for disposal around said animal, a top portion of said body member having a first D-ring and a second D-ring attached thereto and a bottom portion of said body member having a third D-ring and a fourth D-ring attached thereto, said first D-ring and said third D-ring attached to a left side of said body member and said second D-ring and said fourth D-ring attached to a right side of said body member;

a cord member for pulling said first and second loop means perpendicular to the left foreleg and right foreleg of said animal to restrict movement of the animal's left foreleg and right foreleg thus effectively restraining and immobilizing the animal, said cord member operatively associated with said first loop means and said second loop means, said cord member having a first end and a second end, said first end of said cord member having a first snap hook member attached thereto and said second end of said cord member having a second snap hook member attached thereto;

a first loop means for disposal around said left foreleg, said first loop means defined by inserting said first snap hook member and said first end of said cord member through said first D-ring and said third D-ring and attaching said first snap hook member to said third D-ring, said first loop means having means for protecting the animal's left foreleg when said first loop means is disposed around said left foreleg;

a second loop means for disposal around said right foreleg, said second loop means defined by inserting said second snap hook member and said second end of said cord member through said second D-ring and said fourth D-ring and attaching said second snap hook member to said fourth D-ring, said second loop means having means for protecting the animal's right foreleg when said second loop means is disposed around said right foreleg; and means for attaching a conventional leash to said cord member, said means for attaching disposed and retained along said cord member intermediate said first end and said second end of said cord member.

* * * * *